US009117132B2

(12) United States Patent
Chattopadhyay et al.

(10) Patent No.: US 9,117,132 B2
(45) Date of Patent: Aug. 25, 2015

(54) SYSTEM AND METHOD FACILITATING DESIGNING OF CLASSIFIER WHILE RECOGNIZING CHARACTERS IN A VIDEO

(71) Applicant: TATA CONSULTANCY SERVICES LIMITED, Mumbai (IN)

(72) Inventors: Tanushyam Chattopadhyay, West Bengal (IN); Bidyut B. Chaudhuri, West Bengal (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 76 days.

(21) Appl. No.: 14/081,871

(22) Filed: Nov. 15, 2013

(65) Prior Publication Data

US 2014/0140622 A1    May 22, 2014

(30) Foreign Application Priority Data

Nov. 16, 2012 (IN) .......................... 3308/MUM/2012

(51) Int. Cl.
*G06K 9/18* (2006.01)
*G06K 9/32* (2006.01)
*G05B 13/02* (2006.01)

(52) U.S. Cl.
CPC ................ *G06K 9/18* (2013.01); *G06K 9/3266* (2013.01)

(58) Field of Classification Search
CPC ........................................................ G06K 9/00
USPC .......... 382/140, 182, 183, 229, 292, 317, 321
See application file for complete search history.

(56) References Cited

U.S. PATENT DOCUMENTS 8,370,869 B2 *    2/2013    Paek et al. ....................... 725/19

* cited by examiner

*Primary Examiner* — Abolfazl Tabatabai
(74) *Attorney, Agent, or Firm* — Finnegan, Henderson, Farrabow, Garrett & Dunner, LLP

(57) ABSTRACT

The present disclosure relates to designing of a hierarchy of feature vectors. In one embodiment, a method for facilitating design of a hierarchy of feature vectors while recognizing one or more characters in a video is disclosed. The method comprises collecting one or more features from each of the segments in a video frame extracted from a video; preparing multi-dimensional feature vectors to classify the one or more characters; calculating a minimum distance between the multi-dimensional features vectors of a test character and the multi-dimensional feature vectors of a pre-stored character template; selecting, with respect to a decreasing order of the minimum distance, the multi-dimensional feature vectors to design a hierarchy of the multi-dimensional feature vectors; and classifying the characters based on the hierarchy of the multi-dimensional feature vectors.

17 Claims, 3 Drawing Sheets

SYSTEM AND METHOD FACILITATING DESIGNING OF CLASSIFIER WHILE RECOGNIZING CHARACTERS IN A VIDEO

CROSS-REFERENCE TO RELATED APPLICATIONS AND PRIORITY

This U.S. patent application claims priority under 35 U.S.C. §119 to: Indian Patent application No. 3308/MUM/2012, filed on Nov. 16, 2012. The aforementioned application is incorporated herein by reference in its entirety.

TECHNICAL FIELD

The present disclosure in general relates to designing of a hierarchy of features. More particularly, the present disclosure relates to the designing of the hierarchy of features while recognizing text characters in a video.

BACKGROUND

Recent market report on Consumer Electronics shows that TV with Internet is going to be one of the most demanding products for the near future. As a consequence the demand of recognizing the TV context also increases among the research community. Lots of information about the TV video may be obtained from the meta data in case of digital TV broadcast. But in the developing countries like India, the penetration of digital TV is still near about 10%.

Video OCR may be required to process images/frames of a video with maximum 720×576 pixels. The resolution here may be low compared to the document images which are mostly scanned at 300 dots per inch (dpi) or the images captured using 8 mega pixel camera.

Video OCR may not be required to reproduce the fonts since the main intention is to recognize the text to get the context. On the other hand, document image OCRs may be required to recognize the font too.

In some circumstances, font variation in the text of different TV channels may be small. For example, the texts are generated and blended over the video content using some hardware and the variation of such hardware used in the studios may be small as there are not many manufacturers of such hardware.

SUMMARY

Before the present methods, are described, it is appreciated that this application is not limited to the particular embodiments of the systems and methodologies described, as there can be multiple possible embodiments which are not expressly illustrated in the present disclosures. This summary is provided to introduce aspects related to system(s) and method(s) for designing a classifier while recognizing texts from videos and the aspects are further described below in the detailed description. This summary is not intended to identify essential features of the claimed subject matter nor is it intended for use in determining or limiting the scope of the claimed subject matter.

In one embodiment, a method for facilitating design of a hierarchy of features while recognizing one or more characters in a video is disclosed. The method comprises collecting one or more features from each of the segments in a video frame, the video frame having been extracted from a video and divided into multiple segments; preparing, using the one or more features, multi-dimensional feature vectors to classify the one or more characters; calculating a minimum distance between the multi-dimensional features vectors of a test character and the multi-dimensional feature vectors of a pre-stored character template, wherein the test character is the character to be classified and is present in the video, and wherein the minimum distance is a distance representing a closeness between the characters; selecting, with respect to a decreasing order of the minimum distance, the multi-dimensional feature vectors to design a hierarchy of the multi-dimensional feature vectors; and classifying the one or more characters based on the hierarchy of the multi-dimensional feature.

In one embodiment, a system for facilitating design of a hierarchy of features while recognizing one or more characters in a video is disclosed. The system comprises one or more processors; a memory storing processor-executable instructions comprising instructions to: collect one or more features from each of the segments in a video frame, the video frame having been extracted from a video and divided into multiple segments; prepare, using the one or more features, multi-dimensional feature vectors to classify the one or more characters; calculate a minimum distance between the multi-dimensional feature vectors of a test character and the multi-dimensional feature vectors of a pre-stored character template, wherein the test character is the character to be classified and is present in the video, and wherein the minimum distance is a distance representing a closeness between the characters; select, with respect to a decreasing order of the minimum distance, the multi-dimensional feature vectors, to design a hierarchy of the multi-dimensional feature vectors; and classify the one or more characters based on the hierarchy of multi-dimensional feature vectors.

In one embodiment, a non-transitory computer program product having embodied thereon computer program instructions for is disclosed. The instructions comprises instructions for collecting one or more features from each of the segments in a video frame, the video frame having been extracted from a video and divided into multiple segments; preparing, using the one or more features, multi-dimensional feature vectors to classify the one or more characters; calculating a minimum distance between the multi-dimensional feature vectors of a test character and the multi-dimensional feature vectors of a pre-stored character template, wherein the test character is the character to be classified and is present in the video, and wherein the minimum distance is a distance representing a closeness between the characters; with respect to a decreasing order of the minimum distance, the multi-dimensional feature vectors to design the hierarchy of multi-dimensional feature vectors; and classifying the one or more characters based on the hierarchy of the multi-dimensional feature vectors.

BRIEF DESCRIPTION OF DRAWINGS

The accompanying drawings, which are incorporated in and constitute a part of this disclosure, illustrate exemplary embodiments and, together with the description, serve to explain the disclosed principles. The detailed description is described with reference to the accompanying figures. In the figures, the left-most digit(s) of a reference number identifies the figure in which the reference number first appears. The same numbers are used throughout the drawings to refer like features and components.

DETAILED DESCRIPTION

Exemplary embodiments are described with reference to the accompanying drawings. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. While aspects of the described systems and methods for facilitating design of a hierarchy of the feature vectors while recognizing texts from videos may be implemented in any number of different computing systems, environments, and/or configurations, the embodiments are described in the context of the following exemplary system.

Figure 1:
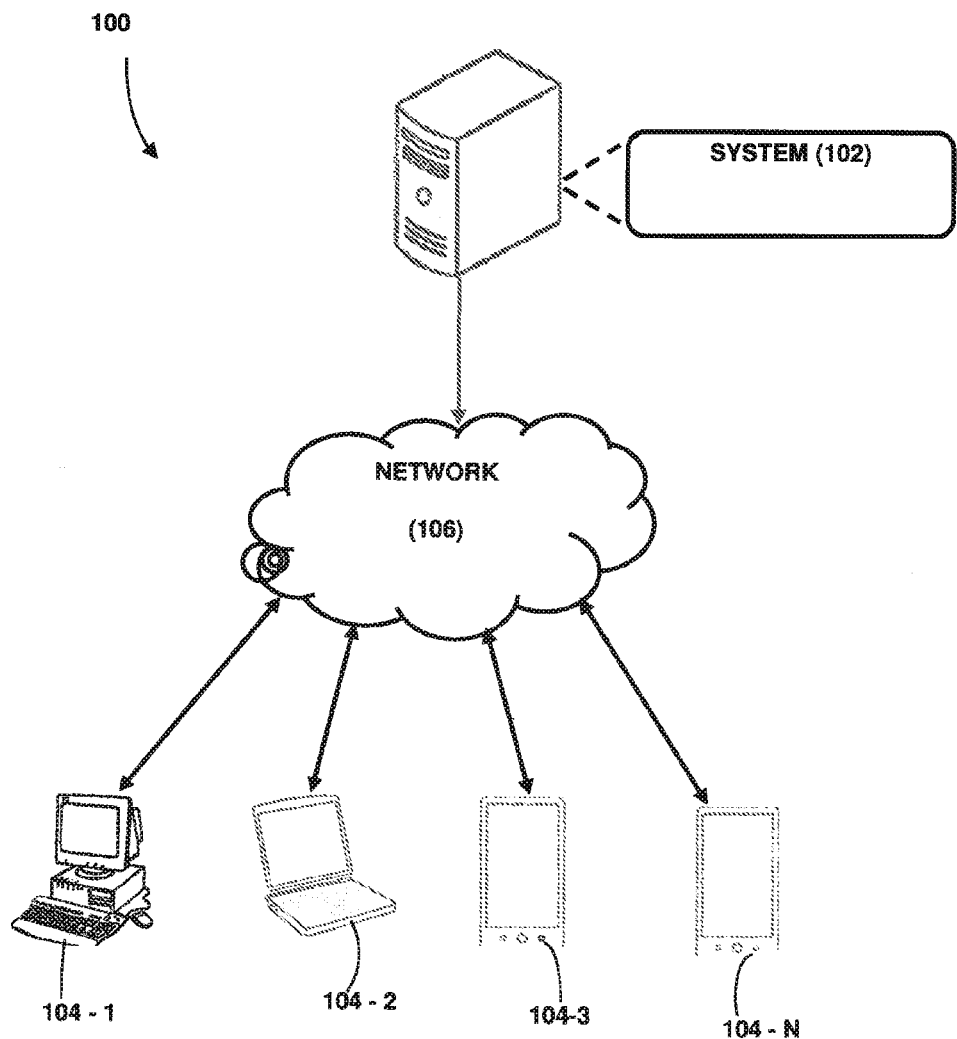
FIG. 1 illustrates a network implementation of a system for providing design of classifier while recognizing one or more characters in a video is shown, in accordance with an embodiment of the present subject matter.

Referring now to FIG. 1, a network implementation 100 of system 102 for facilitating design of a hierarchy of the feature vectors while recognizing text in a video is shown. A video frame from the video is extracted and is divided into segments. Features are collected from each segment in the video frame and feature vectors are prepared. The feature vectors are selected based on a decreasing order of the minimum distance. The feature vectors are used to generate a hierarchy of feature vectors to classify the text characters present in the video.

Although the present subject matter is explained considering that the system 102 is implemented as an application on a server, it may be appreciated that the system 102 may also be implemented in a variety of computing systems, such as a laptop computer, a desktop computer, a notebook, a workstation, a mainframe computer, a server, a network server, and the like. It will be appreciated that the system 102 may be accessed by multiple users through one or more user devices 104-1, 104-2 . . . 104-N, collectively referred to as user 104 hereinafter, or applications residing on the user devices 104. Examples of the user devices 104 may include, but are not limited to, a portable computer, a personal digital assistant, a handheld device, and a workstation. The user devices 104 are communicatively coupled to the system 102 through a network 106.

In some embodiments, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further, the network 106 may include a variety of network devices, including routers, bridges, servers, computing devices, storage devices, and the like.

Figure 2:
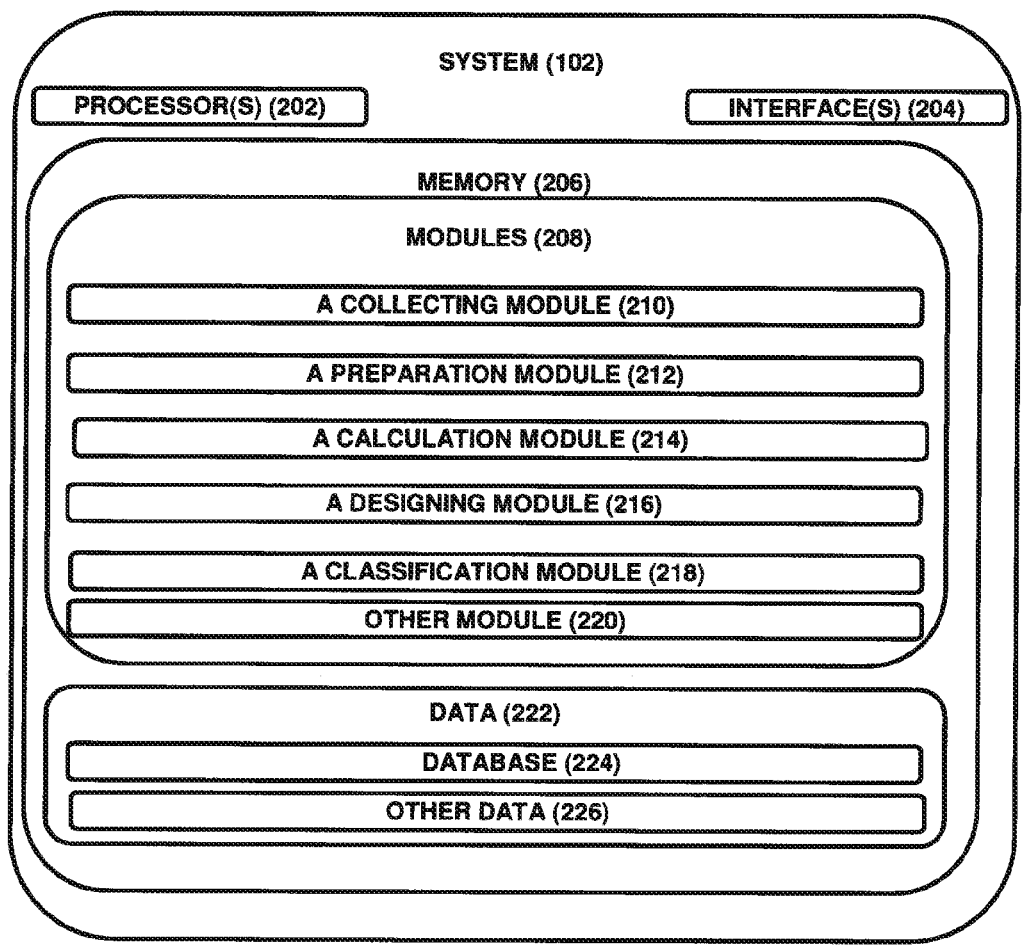
FIG. 2 illustrates the system for providing design of classifier while recognizing one or more characters in a video, in accordance with an embodiment of the present subject matter.
Figure 3:
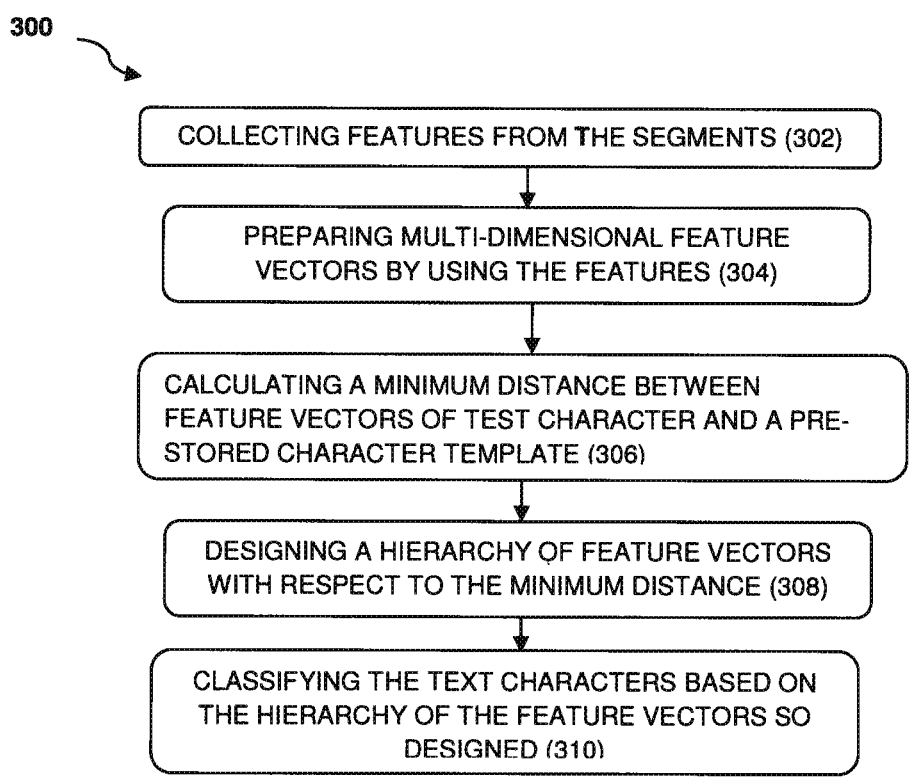
FIG. 3 illustrates a method for providing design of classifier while recognizing one or more characters in a video, in accordance with an embodiment of the present subject matter.

Referring now to FIG. 2, the system 102 is illustrated in accordance with an embodiment of the present subject matter. In some embodiments, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 may be configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with a user directly or through the client devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 226.

The modules 208 may include routines, programs, objects, components, data structures, etc., which perform particular tasks and functions, or implement particular abstract data types. In one implementation, the modules 208 may include a collection module 210, a preparation module 212, a calculation module 214, a designing module 216, and a classification module 218. The other modules 220 may include programs or coded instructions that supplement applications and functions of the system 102.

The data 222, among other things, may serve as a repository for storing data processed, received, and generated by one or more of the modules 208. The data 222 may also include a database 224, and other data 226. The other data 226 may include data generated as a result of the execution of one or more modules in the other module 220.

The present disclosure relates to a system 102 to provide a low complexity embeddable OCR (Optical Character Recognition) to recognize features. The features comprises of numerals and special characters, such as "," and "(". Such type of features are often seen in videos (e.g., sports videos), information in various shows (e.g., recipe shows), news video clips, subtitle video text in video frame, etc.

The collection module 210 may collect one or more features from the multiple segments in the video frame. The video frame has been extracted from a video and divided into multiple segments.

The preparation module 212 may prepare multi-dimensional feature vectors by using the features. The multi-dimensional feature vectors (or simply feature vectors for simplicity) are used to classify the characters present in the video. The feature vectors comprises of Vertical Projection (F1), Horizontal Projection (F2), Contour (F3), and Stroke Direction (F4).

The calculation module 214 may compute a minimum distance, such as Euclidian distance, as a classifier to reduce the complexity. The Euclidian distance does not put any significant effect on the recognition accuracy. The minimum distance is a distance representing closeness between the characters. In some embodiments, the system can perform two steps in designing a hierarchy of features while recognizing characters in the video. The two steps are template creation step/phase (giving pre-stored template here) and a testing step/phase. In the template creation phase, a 448 dimensional feature vector is extracted for each character and the 448 dimensional feature vectors are stored as template. In the testing phase, the features are extracted after designing a hierarchy of the features. The hierarchy of feature vectors is designed with respect to a decreasing order of the minimum distance. After each level present in the hierarchy of features to be followed for recognizing characters (text characters) in the video, Euclidian distance between each feature at each level in the hierarchy and the character in the template is calculated. The text characters are mapped to a point in a higher dimension. The pre-stored template is used for mapping text characters. The characters in the template may be represented as a point in the same vector space.

The calculation module 214 may calculate the Euclidian distance ($d_{t,\tau i}$) between a test character and each of the $i^{th}$ character from the template characters. The test character is the $i^{th}$ character if $(d_{t,\tau i}) < (d_{t,\tau j})$ $\forall j \in$ template-set and $j \neq i$ and $d_{t,\tau i} < Th_{dist}$, where $Th_{dist}$ is the threshold. The threshold value is a heuristically obtained value.

The Euclidean distance between two point (x1, y1) and (x2, y2) is $SQRT((x1-x2)^2+(y1-y2)^2))$.

In some embodiments, at a first time, Euclidian distance can be calculated to design a hierarchy of the feature vectors. At a second time, the Euclidian distance can be calculated to classify the characters by calculating minimum distance.

The designing module selects 216 may design a hierarchy of the feature vectors based on the decreasing order of the minimum distance. The feature vectors are selected in a manner such that the minimum distance ($d_{t,\tau j}$) between the $i^{th}$ and $j^{th}$ character of the template set for each pair of i and j should be as much as possible, so that the possibility of miscalssification is minimum. While calculating the minimum distance, it is observed that an average of ($d_{\tau i,j}$) while considering all features is less than that of a subset of feature vectors, namely F2 and F4. Referring to Table 1, in some embodiments, the feature vectors Horizontal Projection and Strole Direction may each produces better recognition accuracy compared to all feature vectors together.

A Comparative analysis of features is discussed below. The comparative analysis can be a one time process to calculate accuracy for each of the features.

TABLE 1

| Feature Groups | % Accuracy |
| --- | --- |
| Vertical Projection | 49.53 |
| Horizontal Projection | 77.31 |
| Contour | 16.88 |
| Stroke | 81.58 |
| All Features | 77.08 |

The designing module 216 may be configured to design a hierarchy of features. The hierarchy of the features comprises a plurality of levels. The levels can be used to recognize characters to increase the recognition accuracy and to reduce computational cost. The levels are formed based on the decreasing order of the minimum distance.

Classifications error may arise due to false positives or misses and may lead to misclassifications. For example, if any text character is recognized as "B," it may happen that the text character is truly a "B," or is some other characters, for example, "g," which is mis-recognized as "B." If the text character is truly a "B," it is referred to as a correct recognition. But if it is the second case, i.e., mis-recognition, it may be referred to as the false positive. Also, in one scenario, any test character may be recognized as some other character or may not be recognized at all. Therefore, the recognition accuracy may be measured in terms of two parameters, namely, Recall (R) and Precision (P). The Recall may be defined as R=C/(C+M) and Precision may be defined as P=C/(C+FP), where C, M, and FP indicates Correct recognition, Misses, and False positives, respectively. Character-wise performance of each of the features is shown in Table 2 and Table 3. It may be observed that performance of F1 and F3 never exceeds the performance of the features taken together. Therefore, only F2, F4, and all are shown below.

Below mentioned Table 2 shows Recall of different Features:

TABLE 2

| C | F2 | F4 | All | C | F2 | F4 | All |
| --- | --- | --- | --- | --- | --- | --- | --- |
| 1 | 1 | 1 | 1 | 2 | 1 | 1 | 1 |
| 4 | 1 | 1 | 1 | 6 | 1 | 1 | 1 |
| A | 1 | 1 | 1 | A | 0.83 | 0.85 | 0.71 |
| B | 0.18 | 1 | 0.88 | B | 1 | 1 | 1 |
| C | 0.81 | 0.72 | 0.73 | I | 0.95 | 0.89 | 0.92 |
| D | 0.56 | 0.48 | 0.36 | D | 0.84 | 0.8 | 0.77 |
| E | 1 | 0.81 | 0.85 | E | 0.76 | 0.95 | 0.88 |
| F | 0.22 | 1 | 1 | F | 1 | 1 | 1 |
| G | 0.95 | 1 | 1 | G | 1 | 1 | 1 |
| H | 0.96 | 0.94 | 0.46 | H | 0.41 | 0.43 | 0.30 |
| J | 1 | 1 | 1 | K | 1 | 1 | 1 |
| L | 1 | 1 | 1 | O | 0.51 | 0.69 | 0.80 |
| M | 1 | 1 | 1 | M | 0 | 0.67 | 0.64 |
| N | 0.26 | 1 | 1 | N | 0.65 | 0.84 | 0.82 |
| P | 1 | 1 | 1 | P | 1 | 1 | 1 |
| Q | 1 | 1 | 1 | S | 0.73 | 0.82 | 0.61 |
| R | 0.42 | 1 | 0.79 | R | 1 | 1 | 1 |
| T | 0.94 | 0.62 | 0.45 | T | 0.72 | 0.51 | 0.46 |
| U | 0 | 1 | 0 | U | 1 | 1 | 1 |
| V | 1 | 1 | 1 | V | 1 | 1 | 1 |
| W | 1 | 1 | 1 | Z | 1 | 1 | 1 |
| Y | 1 | 1 | 1 | Y | 0.79 | 0.91 | 0.94 |
| & | 1 | 1 | 1 | @ | 0 | 0.02 | 0.68 |

The following observations may be made from analysis of the feature wise recognition accuracy and is used to decide various levels in the hierarchy of the feature vectors: F4 alone may recognize the 89% characters with higher accuracy compared to the all features taken together; F4 alone may recognize 81% characters of the test set with more than 85% recall and precision; F2 alone may recognize 20% of the rest characters with more than 85% recall and precision; Some confusion made by feature F4 may be rectified by F2 very efficiently. For example, the "B" and "a" are assigned to the same class by F4 but the "a" may be classified very efficiently by F2.

Table 3 shows Precision of different features:

TABLE 3

| C | F2 | F4 | All | C | F2 | F4 | All |
| --- | --- | --- | --- | --- | --- | --- | --- |
| 1 | 0 | 0 | 0.25 | 2 | 1 | 1 | 1 |
| 4 | 1 | 1 | 1 | 6 | 0 | 0 | 0 |
| A | 0.77 | 0.98 | 1 | A | 0.90 | 0.74 | 0.77 |
| B | 0.08 | 0.31 | 0.35 | B | 0.82 | 0.34 | 0.54 |
| C | 0.97 | 1 | 1 | I | 0.94 | 1 | 0.99 |
| D | 0.39 | 0.78 | 0.79 | D | 0.97 | 1 | 1 |
| E | 0.99 | 1 | 0.98 | E | 0.99 | 0.85 | 0.89 |
| F | 1 | 1 | 1 | F | 0 | 0 | 0 |
| G | 0.44 | 0.39 | 0.13 | G | 1 | 1 | 0.94 |
| H | 0.61 | 1 | 1 | H | 0.95 | 1 | 1 |

TABLE 3-continued

| C | F2 | F4 | All | C | F2 | F4 | All |
|---|----|----|-----|---|----|----|-----|
| J | 1 | 1 | 1 | K | 0.95 | 1 | 0.77 |
| L | 0.82 | 0.86 | 0.6 | O | 0.74 | 0.63 | 0.65 |
| M | 0 | 1 | 1 | M | 0.71 | 0.77 | 1 |
| N | 0.83 | 1 | 0.36 | N | 0.36 | 0.89 | 0.97 |
| P | 0 | 1 | 1 | P | 1 | 0.82 | 0.89 |
| Q | 0 | 0.38 | 0 | S | 1 | 1 | 0.99 |
| R | 0.44 | 1 | 1 | R | 0.99 | 1 | 1 |
| T | 0.93 | 1 | 1 | T | 0.94 | 0.7 | 0.67 |
| U | 0 | 0 | 1 | U | 0 | 1 | 1 |
| V | 0 | 1 | 1 | V | 1 | 1 | 1 |
| W | 0 | 0 | 1 | Z | 1 | 1 | 1 |
| Y | 0 | 1 | 1 | Y | 0.69 | 0.98 | 0.78 |
| & | 0 | 1 | 1 | @ | 1 | 0.75 | 0.11 |

Based on the above described four presumptions, the designing module 220 may design the hierarchy of the feature vectors to design the classifier by using an order (or levels of recognition) or feature vectors so selected. In some embodiments, the hierarchy of the feature vectors comprises a plurality of levels, such as the below mentioned levels, for recognizing the characters. For example, at a first level, compute distance with respect to feature 4 and classify. If classified as (A, E, F, H, I, K, L, N, P, R, S, d, e, g, p, r, u, y), conclude that it is the final decision. Otherwise, follow next step; at a second level, apply feature 2, if classified as (C, T, a, b), conclude that it is the final decision. Otherwise, follow next step; at a third level, use all four types of features for classification.

The above mentioned steps or levels present in hierarchy of the features vectors may be used by the classification module 218 (or classifier) to classify the characters.

The classification module 218 may be configured to classify the text characters based on the hierarchy of the feature vectors so designed and described above.

Table 4 shows results obtained by using the hierarchy of feature vectors for designing classification module 218 (or classifier) by the system 102. In some embodiments, standard deviation of recognition accuracy for different video sequences taken from different channels is also small. Standard deviation is a measure that may assist in calculating how data points are distributed with respect to a mean position. Therefore, the low standard deviation means that the results are consistent. The higher standard deviation with almost similar recognition accuracy indicates that the system 102 is over trained with the fonts of a particular font set, and thus provides better recognition accuracy for the texts of a channel that uses that particular font. Factors, such as stability, are described in table 4. Time requirement by the system 102 for processing one frame is also significantly low, which makes it possible to deploy on an embedded platform. The examples of embedded platforms may be any android mobile platforms or any DSP (Digital Signal Processing) platforms.

TABLE 4

| Parameter | System 102 |
|---|---|
| Accuracy | 84.23% |
| Stability | 0.07 |
| Time/Frame (in millisecond) | 26.34 |
| Memory Requirement | 2268 Bytes |

The system 102 may be tested on a set of video that contains, for example, 100 Indian TV shows having 996 minute duration. In some embodiments, system 102 may recognize 63 characters, which consists of 26 capital and 26 small letters, 10 digits and one special character &. The test video, as an example, includes only 40 characters. The test characters that are not in the test videos are 2, 4, J, M, Q, U, V, W, Y, Z, v, &. Sources of errors belong to the characters 1, 6, B, D, G, O, f, h, m, n, t. Confusion classes are created by the system 102 as shown in Table 5. It may be observed that the shape of "B", "a", and "g" is almost similar, and thus is not binarized properly. Similarly, the middle part of the character set (t, 1, I, L, f) is also similar. Therefore, if the top or bottom parts of the characters are not properly segmented or binarized, it may lead to confusion. The classification of the confusion classes may be solved by using any language model or by defining a new feature that may classify among these confusion classes.

TABLE 5

| | Confusion classes | |
|---|---|---|
| Character (i) | Characters recognized as $i^{th}$ | $I^{th}$ character recognized as others |
| 1 | (1, S, T, t, y) | — |
| 6 | (6, C, H, O, e) | — |
| B | (B, a) | (B, g) |
| D | (D, h) | (D, O) |
| G | (G, C, S, a, e) | — |
| O | (O, D, U, n) | (O, 6, a, e, n) |
| F | (f, I, T, t) | — |
| H | — | (h, D, b) |
| T | (t, E, T, y) | (t, 1, I, L, f, y) |

The system 102 may be used to design a classifier, e.g., by designing a hierarchy of feature vectors, while recognizing characters from a video. The classifier 222 (or classification module) may be used in a video OCR (Optical Character Recognition) and may be used in devices of low computation power like mobile hand-phone. To avoid more computation, single feature based minimum distance classifiers can be combined to obtain an optimum performance. An example of text character recognition by using a classifier designed by the system 102 can be small texts, such as those appear on a car number plate.

The order in which the method 300 is described is not intended to be construed as a limitation, and any number of the described method blocks can be combined in any order to implement the method 300 or alternate methods. Additionally, individual blocks may be deleted from the method 300 without departing from the spirit and scope of the subject matter described herein. Furthermore, the method can be implemented in any suitable hardware, software, firmware, or combination thereof. However, for ease of explanation, in the embodiments described below, the method 300 may be considered to be implemented in the above described system 102.

At block 302, one or more features may be collected from each segment.

At block 304, multi-dimensional feature vectors may be prepared from the one or more features.

At block 306, a minimum distance may be calculated between multi-dimensional feature vectors of a test character and multi-dimensional feature vectors of a pre-stored character template.

At block 308, a classifier may be designed by creating a hierarchy of the multi-dimensional feature vectors by selecting multi-dimensional feature vectors with respect to the minimum distance.

At block 310, the characters may be classified by extracting the hierarchy of the one or more features vectors so designed.

It is appreciated that the written description describes the subject matter herein to enable any person of ordinary skill in the art to make and use the embodiments of the present disclosure. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

We claim:

1. A method for facilitating design of a hierarchy of features while recognizing one or more characters in a video, the method being performed by a processor using programmed instructions stored in a memory, the method comprising:
   collecting one or more features from each of the segments in a video frame, the video frame having been extracted from the video and divided into multiple segments;
   preparing, using the one or more features, multi-dimensional feature vectors to classify the one or more characters;
   calculating a minimum distance between the multi-dimensional features vectors of a test character and the multi-dimensional feature vectors of a pre-stored character template, wherein the test character is the character to be classified and is present in the video frame, and wherein the minimum distance is a distance representing a closeness between the characters;
   selecting, with respect to a decreasing order of the minimum distance, the multi-dimensional feature vectors to design a hierarchy of the multi-dimensional feature vectors; and
   classifying the one or more characters based on the hierarchy of the multi-dimensional feature vectors.

2. The method of claim 1, wherein extracting the image comprises using an image processing technique and an OCR (Optical Character Recognition) technique.

3. The method of claim 1, wherein the one or more characters include text characters.

4. The method of claim 1, wherein the one or more features comprise at least one of numerals, alphabets, and special characters.

5. The method of claim 1, wherein the multi-dimensional feature vectors comprise one or more of a Vertical projection, a Horizontal Projection, a Contour, and a Stroke Direction, the one or more of a Vertical projection, a Horizontal Projection, a Contour, and a Stroke Direction being applied in a sequence as one or more levels.

6. The method of claim 1, wherein the minimum distance comprises a Euclidian distance.

7. The method of claim 1, further comprising checking a condition of least misclassification based on calculating Recall and Precision values for one or more of the multi-dimensional feature vectors and based on the minimum distance.

8. The method of claim 1, wherein the hierarchy of features comprises one or more levels formed based on the decreasing order of the minimum distance, the one or more levels including at least one of a first level, a second level, and a third level, wherein the first level corresponds to recognition of the one or more characters based on stroke direction, wherein the second level corresponds to recognition of the one or more characters based on Horizontal projection, and wherein the third level corresponds to recognition of the one or more characters based on all the multi-dimensional feature vectors.

9. A system for facilitating design of a hierarchy of features while recognizing one or more characters in a video, the system comprising:
   one or more processors;
   a memory storing processor-executable instructions comprising instructions to:
   collect one or more features from each of the segments in a video frame, the video frame having been extracted from a video and divided into multiple segments;
   prepare, using the one or more features, multi-dimensional feature vectors to classify the one or more characters;
   calculate a minimum distance between the multi-dimensional feature vectors of a test character and the multi-dimensional feature vectors of a pre-stored character template, wherein the test character is the character to be classified and is present in the video frame, and wherein the minimum distance is a distance representing a closeness between the characters;
   select, with respect to a decreasing order of the minimum distance, the multi-dimensional feature vectors to design a hierarchy of the multi-dimensional feature vectors; and
   classifying the one or more characters based on the hierarchy of multi-dimensional feature vectors.

10. The system of claim 9, wherein extracting the image comprises using an image processing technique and an OCR (Optical Character Recognition) technique.

11. The system of claim 9, wherein the one or more characters includes text characters.

12. The system of claim 9, wherein the one or more features comprise at least one of numerals, alphabets, and special characters.

13. The system of claim 9, wherein the multi-dimensional feature vectors comprise one or more of a Vertical projection, a Horizontal Projection, a Contour, and a Stroke Direction, the one or more of a Vertical projection, a Horizontal Projection, a Contour, and a Stroke Direction being applied in a sequence as one or more levels.

14. The system of claim 9, wherein the minimum distance comprises a Euclidian distance.

15. The system of claim 9, further comprising checking the condition of least misclassification based on calculating Recall and Precision values for one or more of the multi-dimensional feature vectors and based on the minimum distance.

16. The system of claim 9, wherein the hierarchy of feature vectors is formed with respect to the decreasing order of the minimum distance, the hierarchy of the feature vectors comprises one or more levels, the one or more levels including at least one of a first level, a second level, and a third level, wherein the first level corresponds to recognition of the one or more characters based on a stroke direction, wherein the second level corresponds to recognition of the characters based on a Horizontal projection, and wherein the third level corresponds to recognition of the characters based on all the multi-dimensional feature vectors.

17. A non-transitory computer program product having embodied thereon computer program instructions for facilitating design of a hierarchy of features while recognizing one or more characters in a video, the instructions comprising instructions for:
   collecting one or more features from each of the segments in a video frame, the video frame having been extracted from a video and divided into multiple segments;
   preparing, using the one or more features, multi-dimensional feature vectors to classify the one or more characters;

calculating a minimum distance between the multi-dimensional feature vectors of a test character and the multi-dimensional feature vectors of a pre-stored character template, wherein the test character is the character to be classified and is present in the video, and wherein the minimum distance a distance representing a closeness between the characters;

selecting, with respect to decreasing order of the minimum distance, the multi-dimensional feature vectors to design the hierarchy of multi-dimensional feature vectors; and classifying the characters based on the hierarchy of the multi-dimensional feature vectors.

* * * * *